United States Patent
Richey

(10) Patent No.: US 8,444,722 B2
(45) Date of Patent: *May 21, 2013

(54) ORGANIC FUEL BRICK

(76) Inventor: Michael Richey, Ellington, CT (US)

( * ) Notice: Subject to any disclaimer, the term of this patent is extended or adjusted under 35 U.S.C. 154(b) by 62 days.

This patent is subject to a terminal disclaimer.

(21) Appl. No.: 13/556,592

(22) Filed: Jul. 24, 2012

(65) Prior Publication Data

US 2012/0285081 A1 Nov. 15, 2012

Related U.S. Application Data

(63) Continuation of application No. 12/655,716, filed on Jan. 6, 2010.

(51) Int. Cl.
*C10L 5/00* (2006.01)
*C10L 5/40* (2006.01)
*C10L 5/44* (2006.01)

(52) U.S. Cl.
USPC ............... 44/605; 44/550; 44/552; 44/589; 44/595

(58) Field of Classification Search
USPC ............... 44/550, 552, 589, 593, 594, 595, 44/605, 606
See application file for complete search history.

(56) References Cited

U.S. PATENT DOCUMENTS

| | | | |
|---|---|---|---|
| 3,910,775 A | 10/1975 | Jackman | |
| 4,063,903 A | 12/1977 | Beningson et al. | |
| 4,152,119 A | 5/1979 | Schulz | |
| 4,372,749 A | 2/1983 | Nielsen | |
| 4,496,365 A | 1/1985 | Lindemann | |
| 6,149,694 A * | 11/2000 | Redden et al. | 44/552 |
| 6,506,223 B2 | 1/2003 | White | |
| 6,544,425 B2 | 4/2003 | Miller | |
| 7,252,691 B2 | 8/2007 | Philipson | |
| 2007/0006526 A1 | 1/2007 | Cullen | |

* cited by examiner

*Primary Examiner* — Pamela H Weiss
(74) *Attorney, Agent, or Firm* — Michaud-Kinney Group LLP

(57) ABSTRACT

Ecologically friendly organically composed fuel products are presented whose composition includes, but is not limited to, ingredients: 58 to 60 percent decomposed straw, 38 percent horse or cow manure, two percent hay mixture from various blends used as feed, and two percent straw dust. The above ingredients are subjected to a number of processing steps with the end product being a hydraulically compressed fuel product, such as a brick, block, briquette, blank, pellet, etc., dried to a less than 10 percent moisture content. Eco-friendly organic fuel products may be created from other ingredients than those described herein could undergo the disclosed process to produce other types of fuel items, both organic and inorganic, with the ingredients comprising wood chips, other kinds of animal manure, and wood chips.

15 Claims, 3 Drawing Sheets

ORGANIC FUEL BRICK

CROSS-REFERENCE TO RELATED APPLICATION

This application is a Continuation Application and claims priority to U.S. patent application Ser. No. 12/655,716; filed on Jan. 6, 2010, which is incorporated herein by reference in its entirety.

FIELD OF THE INVENTION

The present invention pertains to methods and processes for taking organic and inorganic material and converting them into eco friendly fuel blocks and pellets, and more particularly pertains to a process for creating ecologically friendly organically composed fuel bricks.

BACKGROUND OF THE INVENTION

The search for new energy sources is an ongoing concern for all humanity as concerns mount over the rate of depletion of oil reserves and other energy sources. Coal, natural gas, wind, solar, nuclear, and hydrogen have numerous hurdles to overcome regarding safety, reliability, and the safe disposal of waste product. The exploitation of new energy sources goes hand in hand with the problem of how to dispose of—and potentially reuse, recycle, or usefully convert—all of the waste material and product, both organic and inorganic, produced by humans, animals, and commercial, agricultural and industrial activities. As the protection and preservation of the environment is of paramount concern, the reuse and recycling of all manner of waste product—human and non-human; organic and inorganic—is being undertaken at all levels of society, whether it is personal, occupational, or governmental.

One of the most common and overlooked sources of waste and potential energy is livestock manure which can include, but is not limited to, manure produced by cattle, horses, sheep, goats, pigs, poultry etc. Such waste amounts to millions of pounds per year, and it must be disposed of in environmentally safe and governmentally approved methods. With economic circumstances squeezing agricultural establishments, especially small farms, along with the increased costs and complexities of appropriately disposing of all the waste materials and products, agricultural establishments and farmers are investigating ways to convert the waste material into a usable product, such as usable fuel that is both eco friendly and can generate profit for the farmer. The prior art discloses a variety of methods and processes for converting various types of organic and inorganic material into usable fuel product.

For example, the Jackman patent (U.S. Pat. No. 3,910,755) discloses a method and an apparatus for handling refuse, using waste and treating raw sewage wherein the material is processed into a source of energy.

The Beningson et al. patent (U.S. Pat. No. 4,063,903) discloses an apparatus for disposal of solid wastes and recovery of fuel product therefrom through the conversion of the organic fraction of such wastes to fuel by the recovery of the constituents of the inorganic fashion.

The Schulz patent (U.S. Pat. No. 4,152,119) discloses briquettes of a specified geometry and composition that are produced to serve as feed material or "burden" in a moving-burden gasifier for the production of a synthesis or fuel gas from organic solid waste materials and coal.

The Nielsen patent (U.S. Pat. No. 4,372,749) discloses a method for the manufacturing of fuel briquettes from selected components of garbage that are comminuted and combined with coal dust.

The Lindemann patent (U.S. Pat. No. 4,496,365) discloses a method of producing briquettes from organic waste products by the use of high pressure to produce sterilized fuel briquettes of high heating values.

The White patent (U.S. Pat. No. 6,506,223 B2) discloses a fuel pellet that is produced by the combination of organic waste material with a binder obtained by direct liquefaction and/or fast pyrolysis of biomass material.

The Miller patent (U.S. Pat. No. 6,544,425 B2) discloses a method of dewatering coal tailings and slurries and removing contaminants therefrom.

The Cullen patent application publication (U.S. patent pub. No. US 2007/0006526 AI) discloses fuel pellet briquettes manufactured from biomass and recovered coal slurries.

The Philipson patent (U.S. Pat. No. 7,252,691 B2) discloses a process for the conversion of municipal solid waste to combustible pellets of high fuel value.

Nonetheless, despite the ingenuity of the above apparatuses, methods, and processes, there remains a need for a process of creating an organic fuel brick from waste matter and organic material readily on agricultural and livestock farms.

SUMMARY OF THE INVENTION

The present invention comprehends a method and process of manufacturing eco friendly organic fuel blocks, bricks, briquettes, blanks, or pellets from organic material that primarily includes straw, cattle, sheep, goats, poultry and horse manure. The finished fuel product, in any of the above forms, is a mixture composed by weight or volume of the following elements, components, or ingredients: at least 58 to 60 percent decomposed straw, at least 38 percent horse or cow manure, two percent hay mixture of various blends that is dry and used as feed, and two percent straw dust that is from material that has been pounded on by animals. The mixture can vary up or down—plus or minus—by up to six percent per each ingredient. The finished product—the organic fuel brick—is hydraulically compressed to a solid configuration weighing approximately two pounds, plus or minus several ounces, and whose dimensions are at least two and one-half inches wide, three and one-half inches high, and six inches in length. The above process could also be used in the creation of fuel bricks, briquettes, blanks, or pellets incorporating wood chips and coal slurry material. Thus, both organic material and/or inorganic material, though not necessarily mixed together, can be subjected to the above process and method for producing fuel products.

It is an objective of the present invention to provide a process and a method for manufacturing an organic fuel brick that is renewable and reduces the carbon footprint on the earth;

It is another objective of the present invention to provide a process and a method for manufacturing an organic fuel brick that is eco friendly and is made from readily available natural resources;

It is yet another objective of the present invention to provide a process and a method for manufacturing an organic fuel brick that burns clean and puts carbon in the ash to be deposited back into the ground;

It is still yet another objective of the present invention to provide a process and a method of manufacturing an organic fuel brick that avoids the formation of creosote in the chimney and reduces any risk of fire;

It is still yet a further objective of the present invention to provide a process and a method of manufacturing an organic fuel brick that eliminates all work from splitting wood, chain saw, use of gasoline, and the problems that arise from wood stacked in the home, the attraction and potential infestation of bugs, and of the labor associated with the above;

A still further objective of the present invention is to provide a process and a method of manufacturing an organic fuel brick that can be manufactured in pellet form for pellet stoves;

Still another objective of the present invention is to provide a process and a method for manufacturing an organic fuel brick that can be used for fertilizer in pots, directly in a garden, and with one of the components helping to keep moisture around plants thereby reducing the need to water the plants;

Still yet another objective of the present invention is to provide a process and a method for manufacturing an organic fuel brick that is wholly organic and eliminates any need for the use of chemicals of any kind; and Yet another objective of the present invention is to provide a process and a method for manufacturing an organic fuel brick that when manufactured and configured in pellet form can be used in a variety of flora that require nutrients.

DETAILED DESCRIPTION OF THE PREFERRED EMBODIMENT

Figure 1:
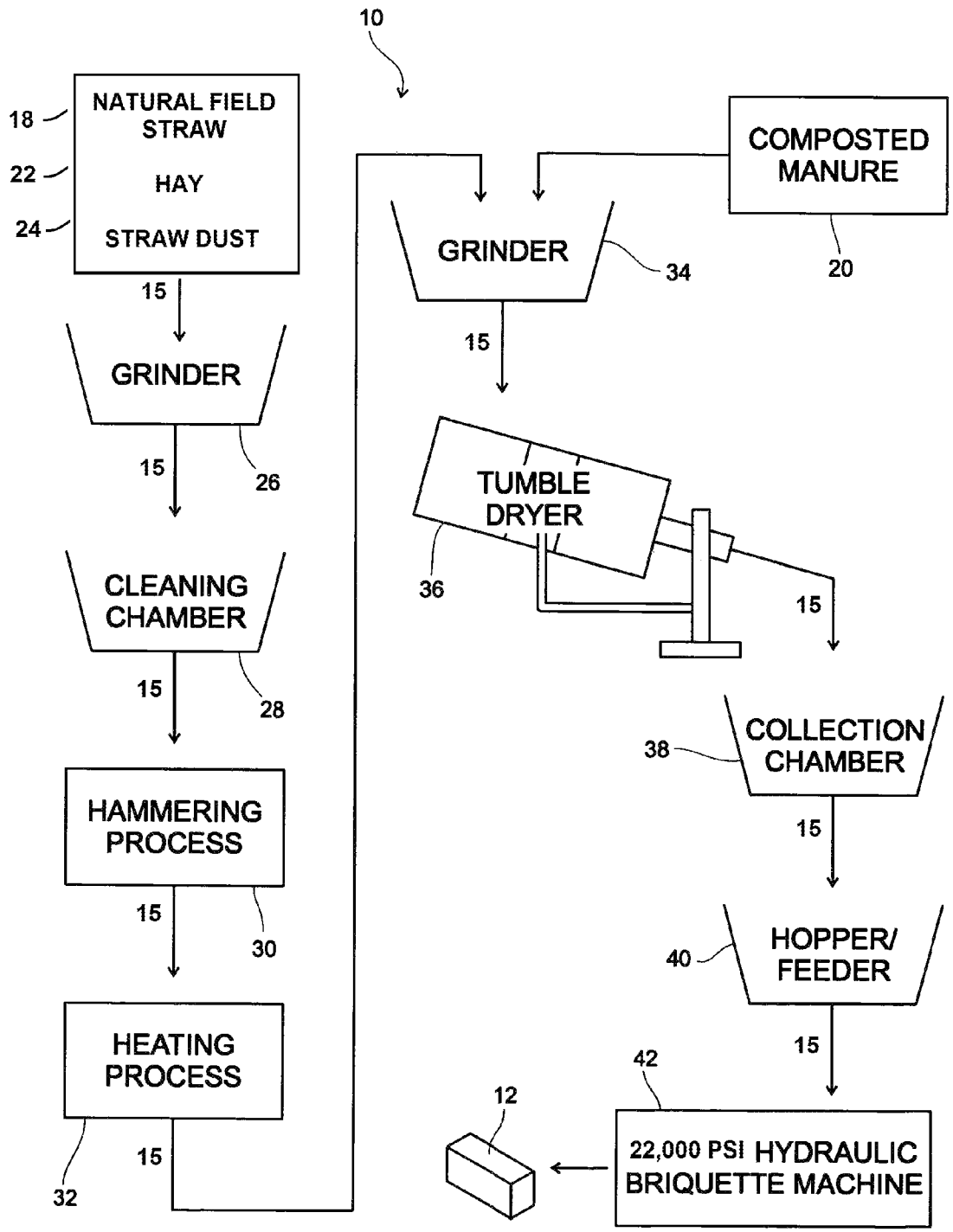
FIG. 1 is a representative schematic diagram or flowchart of the process and method of manufacturing an organic fuel brick illustrating the method and processing steps of converting the natural materials to a usable fuel item.
Figure 2:
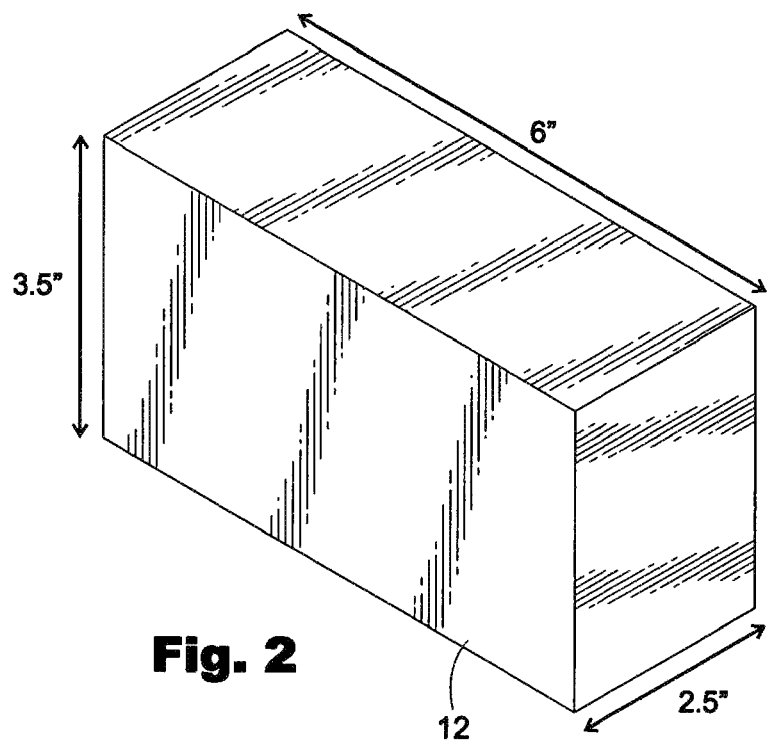
FIG. 2 is a perspective view of the process and method of manufacturing an organic fuel brick illustrating the configuration of the finished product, i.e., a fuel briquette.
Figure 3:
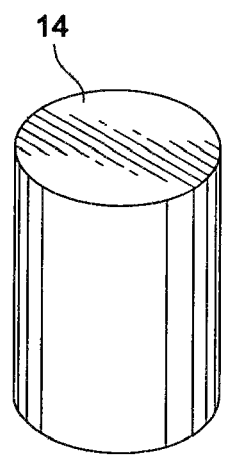
FIG. 3 is a perspective view of the process and method of manufacturing an organic fuel brick illustrating a configuration of the finished product in the form of a cylindrical pellet.

Illustrated in FIGS. 1-4 is a method and/or a process 10 for producing ecologically friendly organically composed fuel bricks, blocks, briquettes, blanks, pellets, etc., which in the preferred embodiment of the end or final product is the fuel brick 12 shown in FIGS. 1 and 2 or, in an alternative embodiment, the end or final product for the fuel item can be in cylindrical pellet 14 form or configuration as shown in FIG. 3.

Figure 4:
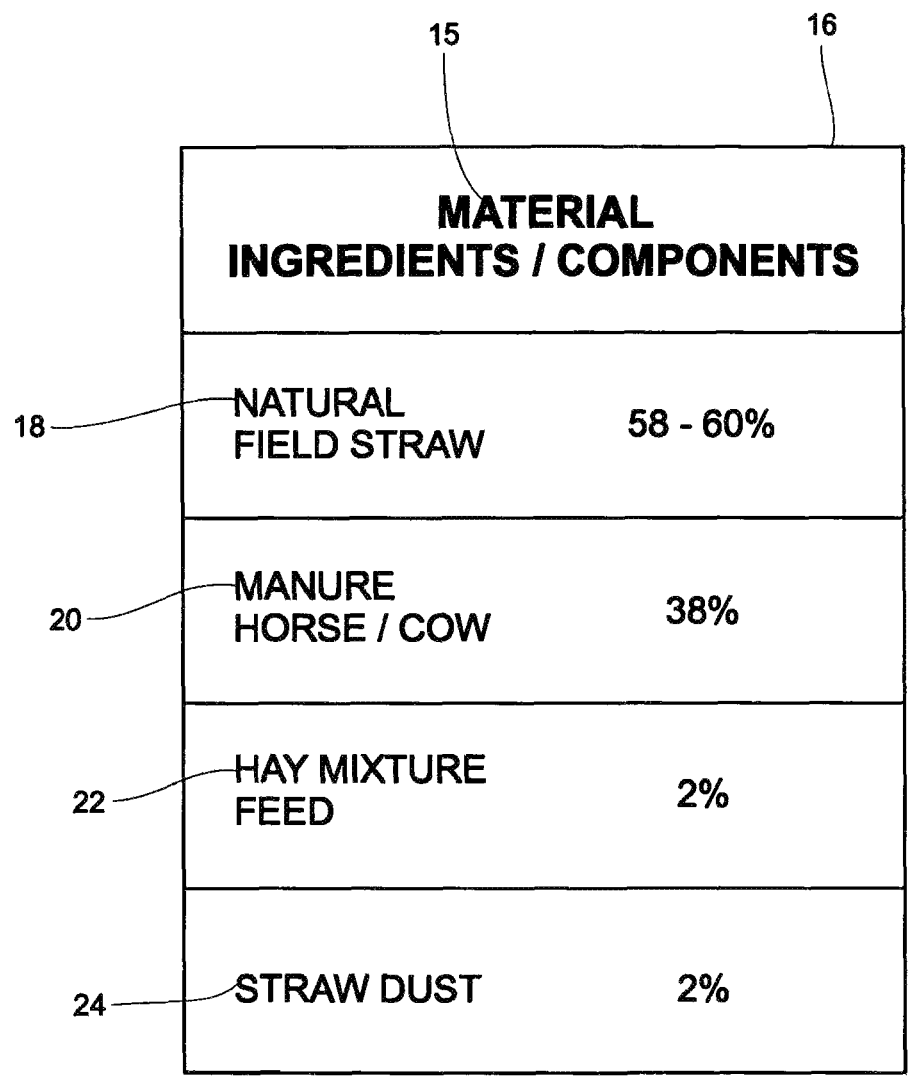
FIG. 4 is a list of the ingredients used in the process and method of manufacturing an organic fuel brick.

As illustrated in FIGS. 1 and 4, the raw organic materials 15, the components or ingredients of the present invention that comprise the fuel brick are as follows and specifically set forth in the table 16 denoted FIG. 4: by weight the fuel brick 12 is comprised of 58 to 60 percent straw 18 that has been hammered, cleaned of all seeds, and heated to a temperature of at least 110 degrees Fahrenheit, then decomposed for a time period of at least 45 days; 38 percent animal manure 20 preferably, but not exclusively limited to, horse or cow manure that is removed from stalls and kept dry under cover and mixed with straw compound; two percent hay 22 mixture from various blends that is dry and used as feed; and two percent straw dust 24 derived from material that has been pounded on by animals such as the aforementioned. It should be noted that the components or ingredients that comprise the mixture that form the fuel brick 12 can vary up or down by approximately six percent plus or minus.

When the process 10 is completed the ingredients that compose the fuel brick 12 are now dried to less than 10 percent of their moisture content. In general, the ingredients or components are run through a medium to a fine grinder 34 in a tube system that then feeds the ingredients or components—the material 15—to a hopper that then feeds the material through to a piping system that is computer controlled. This allows enough raw materials—the ingredients or components—to enter the chamber that forms the fuel block or brick 12. This step is electronically controlled by an eye system. The material is then hydraulically compacted by at least 22,000 plus pounds of pressure thereby creating a block or brick 12 that weighs approximately two pounds plus or minus several ounces. The configuration or dimensions of the end product—the ecologically friendly organic fuel brick 12—include the dimensions of being at least six inches long, two and one half inches wide, and three and one half inches high.

More specifically, with reference to FIG. 1, the process or method 10 for creating or producing the organic fuel brick 12 from the aforedescribed raw organic materials 15 includes the following steps. First, the material 15, i.e., natural field straw 18, hay 22 and straw dust 24 is collected and then the material 15 is deposited in the grinder 26 to undergo a grinding process. Next, the material 15 comprising the natural field straw 18, hay 22 and straw dust 24 passes to a cleaning chamber 28 for cleaning and to undergo the removal of scales and cleaned of all seeds, etc. From there the aforesaid ingredients comprising the material 15 passes to the hammering process 30 and thence to a heating process 32 where the material 15 is heated to a temperature of at least 110 degrees Fahrenheit. The material 15 then passes to a second grinder 34 having a mixing and grinding chamber whereupon manure 20, either horse or cow manure, that has been decomposed or composted for a time period of at least 45 days is also added to the field straw 18, hay 22 and straw dust 24. It should be noted that the percentage amounts of each ingredient or component of the mix of material 15 composed of straw 18, manure 20, either horse or cow, hay 22 and straw dust 24 can vary up or down by at least six percent plus or minus The material 15 that now includes the manure 20 is conveyed to a tumble dryer 36 that dries the material 15 to below less than ten percent of its original moisture content. From there the material 15 is conveyed to a collection chamber 38 and then the material 15 is conveyed to a hopper feeder 40. The hopper feeder 40 feeds the material 15 to a hydraulic briquette machine 42 that compresses or compacts the material 15 by the application of 22,000 plus pounds of pressure thereby creating the organic fuel block 12 having the dimensions as aforestated. It is also possible to configure the hydraulic machine 42 to compress and compact the material 15 to create the cylindrical pellet 14 as shown in FIG. 3.

While various changes in the details, steps, and components that have been described may be made by those skilled in the art within the principles and scope of the invention herein illustrated and defined in the appended claims; therefore, the invention has been shown and described herein in what is believed to be the most practical and preferred embodiments, it is recognized that departures can be made therefrom within the scope of the invention, and that are not to be limited to the details disclosed herein, but is to be accorded the full scope of the claims so as to embrace any and all equivalent processes, methods, steps, and end products.

What is claimed is:

1. A process for creating an organic fuel product from raw organic material, the process comprising:
    placing straw in a first grinder for grinding;
    cleaning the ground straw by removing seeds;
    hammering the straw in a hammering process;
    heating the straw to a temperature of at least 110 degrees Fahrenheit;
    providing the straw to a second grinder for mixing and grinding;
    adding manure to the second grinder for mixing and grinding with the straw;
    providing the mixed and ground straw and manure to a tumble dryer for drying the straw and manure mixture to an amount that is less than ten percent of the original moisture content of the straw; and
    providing the intermixed straw and manure from the tumble dryer to a hydraulic press for compacting and compressing the intermixed straw and manure thereby creating an organic fuel product.

2. The process for creating the organic fuel product of claim 1, further including providing at least one of hay and straw dust that is added to and intermixed with the straw at the first grinder.

3. The process for creating the organic fuel product of claim 1, wherein the hydraulic press exerts a pressure of at least 22,000 pounds per square inch.

4. The process for creating the organic fuel product of claim 1, wherein 58 to 60 percent of the organic fuel product is composed of straw.

5. The process for creating the organic fuel product of claim 1, wherein 38 percent of the organic fuel product is composed of manure.

6. The process for creating the organic fuel product of claim 5 wherein the manure is derived from horses.

7. The process for creating the organic fuel product of claim 5, wherein the manure is derived from cows.

8. The process for creating the organic fuel product of claim 5, wherein the manure is derived from swine.

9. The process for creating the organic fuel product of claim 5, wherein the manure is derived from poultry.

10. The process for creating the organic fuel product of claim 2, wherein 2 percent of the organic fuel product is hay.

11. The process for creating the organic fuel product of claim 2, wherein 2 percent of the organic fuel product is straw dust.

12. The process for creating the organic fuel product of claim 1, wherein a configuration of the fuel product is in the form of cylindrical pellet.

13. The process for creating the organic fuel product of claim 1, wherein a configuration of the fuel product is at least six inches long, at least two and one half inches wide and at least three and one half inches high.

14. The process for creating the organic fuel product of claim 1, further including, prior to the step of adding the manure to the second grinder, composting the manure for a period of time of at least about one day to forty-five days.

15. The process for creating the organic fuel product of claim 2, wherein the hay is at least one of hay that is used to feed animals, hay that is used as bedding for animals and hay that is used as mulch.

* * * * *